Patented Oct. 30, 1934

1,978,839

UNITED STATES PATENT OFFICE 1,978,839

COMPOSITION OF MATTER AND METHOD OF MAKING SAME

Harold Gray, Akron, Ohio, assignor to The B. F. Goodrich Company, New York, N. Y., a corporation of New York No Drawing. Continuation of application Serial No. 187,114, April 27, 1927. This application June 9, 1931, Serial No. 543,137

9 Claims. (Cl. 260—1)

This invention relates to composition of matter derived from rubber and particularly to heat-plastic reaction products of sulphur chloride and rubber and to a method of making such products.

It has been heretofore proposed to effect a vulcanization of rubber compositions with sulphur chloride by dipping the rubber into sulphur chloride, or a diluted solution thereof, by painting the surface of the rubber composition with sulphur chloride, or by exposing the rubber composition in relatively thin sheets to vapors thereof. These processes, commonly known as the cold curing processes, are employed to produce a soft, resilient vulcanized rubber similar to sulphur-vulcanized rubber products.

The present invention is based on the discovery that sulphur chloride may be directly admixed into rubber either alone or preferably by the use of certain vehicles which are more readily miscible with rubber than the sulphur chloride alone, and that the rubber so treated may be subjected to heat to form a product which is entirely different in its properties from that of the rubber vulcanized by the well-known cold cure methods described in the preceding paragraph. The product obtained is a gummy mass, readily plastic at normal or slightly elevated temperatures and hence lacks the nerve, firmness and resilient strength characteristic of rubber normally vulcanized by means of sulphur chloride. It is further distinguished from rubber cold vulcanized with sulphur chloride by its solubility in hydrocarbon solvents. The solutions exhibit satisfactory adhesive properties giving an adhesion of from 5 to 10 times stronger than that obtainable with the best rubber cement.

The sulphur chloride may be directly mixed into rubber on the ordinary rubber mill or in other equivalent apparatus, but since the sulphur chloride gradually stiffens the rubber it is preferred to employ a vehicle which permits of a more rapid incorporation of the sulphur chloride into the rubber. The sulphur chloride may be mixed into a paste with an inert pigment such as carbon black, but the best results are secured by mixing it with a liquid rubber softener such as the vegetable oils and particularly drying oils.

The invention may be best illustrated by reference to the following examples.

*Example 1.*—To make an adhesive material from rubber and sulphur chloride, take 25 parts by weight of sulphur chloride and admix it into 33 parts of linseed oil, and then add the admixture to 100 parts of crude rubber on a rubber mill. The batch is then placed in an unconfined mass in an oven maintained at 310° F. for 10 hours. A somewhat sticky, putty-like mass results, which when dispersed in benzol in the proportion of one pound of the reaction product to one gallon of the solvent gives a satisfactory cement for adhesive purposes.

*Example 2.*—The formula of Example 1 may be varied by substituting for the linseed oil other vehicles, such as tung oil, castor oil, turpentine, rosin oil, petroleum residues and the like. The reaction products obtained where these ingredients are used have the same general characteristics as the reaction product of Example 1, and when dissolved in organic solvents give rise to cements similar to that of Example 1 above.

It will be understood that the proportions of the ingredients in the above examples are merely illustrative and that the proportions may be varied throughout a wide range. Thus, as low as 10% and as high as 50% of the sulphur chloride have been admixed into rubber and heat reaction products formed which have the same general adhesive charcteristics hereinabove noted. The present invention therefore is not limited to any particular proportions of the sulphur chloride employed in the process but it is to be understood that the proportions may be varied according to the characteristics desired in the resulting reaction prcduct.

This application is a continuation of my co-pending application, Serial No. 187,114, filed April 27, 1927.

I claim:

1. The herein described method which comprises dispersing sulphur chloride directly into a mass of crude solid rubber and heating the mass until it is converted to a soft, sticky plastic.

2. The herein described method which comprises dispersing sulphur chloride directly into a mass of crude solid rubber and heating the mass at a temperature of approximately 310° F. for such time as to convert it to a soft, sticky plastic.

3. The herein described method which comprises admixing sulphur chloride with a rubber softener, dispersing the admixture in a mass of crude solid rubber, and heating the mass at a temperature of approximately 310° F. for such time as to convert it to a soft, sticky plastic.

4. The herein described method which comprises admixing sulphur chloride with a drying oil, dispersing the admixture in a mass of crude solid rubber, and heating the mass at a temperature of approximately 310° F. for about 10 hours.

5. As a composition of matter, the sticky, plastic product of the reaction defined in claim 1.

6. As a composition of matter, the sticky, plastic product of the reaction defined in claim 2.

7. As a composition of matter, the sticky, plastic product of the reaction defined in claim 3.

8. As a composition of matter, the sticky, plastic product of the reaction defined in claim 4.

9. As a composition of matter a cement comprising an organic solvent and the sticky, plastic product of the reaction defined in claim 1.

HAROLD GRAY.